(12) United States Patent
Theuret

(10) Patent No.: US 11,942,820 B2
(45) Date of Patent: Mar. 26, 2024

(54) ELECTRICAL GENERATION

(71) Applicant: Adam Theuret, Orting, WA (US)

(72) Inventor: Adam Theuret, Orting, WA (US)

( * ) Notice: Subject to any disclaimer, the term of this patent is extended or adjusted under 35 U.S.C. 154(b) by 776 days.

(21) Appl. No.: 14/879,918

(22) Filed: Oct. 9, 2015

(65) Prior Publication Data

US 2016/0233751 A1    Aug. 11, 2016

Related U.S. Application Data

(60) Provisional application No. 62/062,112, filed on Oct. 9, 2014.

(51) Int. Cl.
| | | |
|---|---|---|
| *H02K 16/00* | (2006.01) | |
| *H01R 39/04* | (2006.01) | |
| *H02K 1/2793* | (2022.01) | |
| *H02K 3/26* | (2006.01) | |
| *H02K 11/04* | (2016.01) | |
| *H02K 13/00* | (2006.01) | |
| *H02K 16/04* | (2006.01) | |
| *H02K 21/24* | (2006.01) | |
| *H02K 23/54* | (2006.01) | |
| *H02K 47/14* | (2006.01) | |

(Continued)

(52) U.S. Cl.
CPC ............. *H02K 16/04* (2013.01); *H01R 39/04* (2013.01); *H02K 1/2793* (2013.01); *H02K 3/26* (2013.01); *H02K 11/044* (2013.01); *H02K 13/006* (2013.01); *H02K 16/00* (2013.01); *H02K 21/24* (2013.01); *H02K 23/54* (2013.01); *H02K 47/14* (2013.01); *H02P 31/00* (2013.01); *H02K 53/00* (2013.01); *Y10S 74/09* (2013.01)

(58) Field of Classification Search
CPC ........ H02K 1/2793; H02K 3/26; H02K 16/02; H02K 21/026; H02K 21/185; H02K 21/24; H02K 23/54
See application file for complete search history.

(56) References Cited

U.S. PATENT DOCUMENTS

| 7,960,884 B2 * | 6/2011 | Miyata ................. H02K 1/2793 |
| | | 310/114 |
| 8,674,528 B2 * | 3/2014 | Kobayakawa ........ B60C 23/041 |
| | | 290/1 R |

* cited by examiner

*Primary Examiner* — Ramon M Barrera
(74) *Attorney, Agent, or Firm* — Patrick M Dwyer

(57) ABSTRACT

An electric motor-generator with a plurality of field coils spaced about the periphery of a stator, and a plurality of permanent magnets spaced about the periphery of each of a pair of rotors, the pair of rotors disposed one on each side of the stator, such that during rotation of the rotors, a center of each magnet generally passes across a center of each coil. The magnets arrayed on respective rotors in alternate pole orientation N-S S-N, the magnets of one rotor offset from the magnets of the other rotor by one pole orientation, such that as a N pole on the one rotor is passing directly across one end of a field coil, a S pole of a corresponding magnet on the other rotor is passing directly across the other end of the field coil.

A rotary electrical switch enables paired alternating periods of current flow and no current flow into respective stator field coils, such that in a period pair the period of current flow is shorter than the period of no current flow. A series of high capacity capacitors is wired in parallel with the field coil power supply such that the capacitors alternately discharge into the field coils when the field coils are switched 'on' In a motor mode, and the capacitors are charged by power from the field coils when the field coils are switched 'off' and are operating in a generator mode.

12 Claims, 7 Drawing Sheets

(51) Int. Cl.
*H02P 31/00* (2006.01)
*H02K 53/00* (2006.01)

ELECTRICAL GENERATION

CROSS REFERENCE TO RELATED APPLICATIONS

This application claims priority to U.S. Provisional Patent application 62/062,112 filed Oct. 9, 2014 which is hereby incorporated by this reference as if fully set forth herein:

TECHNICAL FIELD

This disclosure relates to improved electrical generation; more particularly, it relates to an improved motor-generator apparatus.

BACKGROUND

It is well known that one way of generating an electrical current is to move a magnet into or out of a coil of wire. This movement causes a voltage to be induced across the ends of the coil. At least one kind of generator makes electricity by spinning a coil of wire inside a magnetic field, or by spinning a magnet (pole over pole) inside a coil of wire.

In a common cylinder type generator, having for example a rotor that is a spinning permanent magnet with two magnetic poles, there are one North and one South pole on the rotor and two generator coils (also called field coils) on the stator. See FIG. 1. A four pole generator has four poles on the rotor and four poles on the stator. It is theoretically possible to keep adding poles to lower the input rpms needed to generate 60 Hz 120 v AC.

A motor-generator is an apparatus that has parts and characteristics of both a motor and a generator. That is, with an input of current to its field coils, it will run in a motor mode, spinning a motor shaft; when there is no current input to the field coils, and with the rotor and shaft still spinning, driving the rotor magnets past the cols. It will produce a current output. In some motor-generators, at least a portion of the output current is fed back into the power supply of the apparatus to power its motor mode.

Various apparati and schemes have been proposed to divide, in the same apparatus, the motor mode from the generator mode, and to provide various circuitry and improvements to feed at least a portion of the generator mode output current into the motor mode.

Conventional motor-generators generally rely on conventional arrangements of magnets and coil and on conventional rotary switching systems for alternately powering the coils and cutting them off from power. Conventional commutators with brushes, optical commutators with associated electronics, and shaft absolute position sensors with associated micro-processor and other electronics are known rotary switches.

Conventional rotary switching schemes for motors and generators alike rely on dividing the rotation of the shaft (and rotors) into are fractions of shaft rotation and or on dividing time on (current) from time off (no current). Whether expressed as are fractions or time periods, conventional ratios for On and Off periods or fractions are in the range of unity or greater. That is. It is known to pr vide a rotary switching scheme where any particular field coil is On for the same period or fraction of rotation that it is Off—1:1. It is even more common to provide a rotary switching scheme where any particular field coil is On for a much longer period or fraction of rotation that it is Off, greater than 1:1 (for example 2:1 or 3:1).

Gossler (U.S. Pat. No. 5,514,923) calls for an unequal number of magnets and coils to provide a "designed imbalance that positions adjoining magnets at different degrees of distance from coils ahead and coils behind."

DISCLOSURE

New structural features for electrical generation are disclosed.

In a motor-generator, an arrangement of field coils is disposed radially with respect to the motor-generator axis on a stator (which can be disk shaped) and an array of permanent magnets disposed radially with respect to the same axis on two separate disk rotors, one rotor on either side of the stator disk. Each magnet is desirably a rare earth magnet such as neodymium and the magnets are placed in or on their respective disks with their poles alternating N, S, N . . . etc. The radius from the center of the rotor to the center of each magnet is the same, and is also the same as the radii from the center of the stator to the center of the field coils, so that as the rotors are turned, magnet centers pass directly and successively over coil centers. Since each coil has a series of alternating magnetic poles passing over it, the current in each coil alternates direction. See for example FIGS. 2 and 3.

The rotors are engaged upon the shaft, and are offset from one another on either side of the stator such that as the N pole of a magnet passes over a particular coil on one side, the S pole of a magnet is passing over the same coil on the other side of the coil. This is believed to achieve a doubling of electrical generation over what would be possible with just a single magnet over one end of a coil.

An electric motor-generator is disclosed that has a rotary electrical switch. This switch can be a commutator with brushes, an optical commutator or an absolute shaft position sensor, each with their own required and associated electronics and or micro-processing chips of the kind that will be known to those skilled in the art. These electronics can be now known or later developed. The selected rotary switch enables paired alternating periods of current flow and no current flow into respective stator field coils, such that in a period pair the period of current flow is shorter than the period of no current flow. This relative difference in timing period, or for that matter of shaft are length, can be expressed as a ration. Unlike conventional commutators or other rotary switches typically used in motor-generators, this ratio of period of current flow to the period of no current flow is desirably less than 1:1, for instance less than or equal to 4:6, or even less than or equal to 1:2.

To this end, a motor-generator is disclosed where the rotary switch is a commutator with brushes, and the commutator has a plurality of alternating conducting segment and insulating segment pairs, but the conducting segment of each pair is narrower than the insulating segment. Expressed as a ratio of segment width, or at least as a ratio of shaft are covered by each respective segment, a desirable ratio of conducting segment width to insulating segment width is less than or equal to 4:6, or even less than or equal to 1:2, though ratios approaching but not equaling 1:1 can be made to serve, with variations in efficiency.

From a preselected 'coil on' shaft position (which on a commutator is the leading or advancing edge of the commutator conducting strip with respect to a first edge of the brush) to the 'coil off' position (the trailing edge of the strip with respect to a second edge of the brush) an arc A of shaft rotation is described; from Off to next On, as the brush passes over the insulating strip, an are B of shaft rotation is described. Arc A is always less than Arc B. One example ratio is 40% on, 60 off—or 4:6, with B being 50% greater than A. Even smaller ratios can be made to serve.

A disclosed electric motor-generator includes a set of field coils and a field cell power supply, and a series of high capacity capacitors wired in parallel with the field coil power supply such that the capacitors alternately discharge into the field coils when the field coils are switched 'on' in a motor mode, and the capacitors are charged by power from the field coils when the field coils are switched 'off' and are operating in a generator mode. Advantageously some, and desirably all, of the high capacity capacitors are motor run capacitors or integrated battery capacitors or integrated capacitor batteries, all whether now known or later developed.

A disclosed electric motor-generator has a motor-generator shaft with a shaft axis. The motor-generator has a plurality of field coils generally evenly spaced about a periphery of a stator, desirably some or all of the field coils wound about an axis generally parallel to the shaft axis, wherein axes of respective field coils are generally radially and equidistantly spaced from the shaft axis. The motor-generator has a plurality of permanent magnets generally evenly spaced about a periphery of each of a pair of rotors, desirably some or all of the magnets disposed along an axis of poles generally parallel to the shaft axis, wherein axes of respective magnets are generally radially and equidistantly spaced from the shaft axis on respective rotors by generally the same radius as the field coils are from the shaft axis. The pair of rotors is disposed one on each side of the stator, such that during rotation of the rotors, a center of each magnet generally passes across a center of each coil. The magnets are arrayed on respective rotors in alternate pole orientation N-S S-N, and the magnets of one rotor are offset from the magnets of the other rotor by one pole orientation, such that as a N pole on the one rotor is passing directly across one end of a field coil, a S pole of a corresponding magnet on the other rotor is passing directly across the other end of the field col.

Advantageously, the number of the plurality of permanent magnets on each rotor equal in number to the number of the plurality of field coils. An unequal number (more coils on stator then magnets on a rotor, or vice-versa) can also be made to serve, with more complex timing arrangements which, with this disclosure in mind, persons of skill in the art will be able to make. In one example the number of the plurality of field coils for the motor-generator is eight and the number of magnets on each rotor is eight, and the field coils have air cores.

In another example the motor-generator has a second rotor-stator-rotor set on the same shaft.

In another example the motor-generator has a generator that is shaft-linked to the motor-generator shaft, which is to say that the motor-generator drives a generator on the same shaft, or a shaft that is mechanically linked to the motor-generator shaft. In this example the generator supplies at least a portion of power to the motor-generator that the motor-generator needs during the motor mode of the motor-generator.

The generator in the above example can also be a second motor-generator. In such a case, and also in the case of using a $3^{rd}$ and $4^{th}$ and successive motor-generator units on the same shaft, or shaft-linked, a self-start feature can be enabled. It happens sometimes, where only one and sometimes two of the disclosed motor-generators are on a shaft, that simply applying the external voltage to the coils does not immediately result in a rotational start-up. The shaft position sensor (part of the rotary switch) is in the 'off' position for all coil sets. See example time set listed below for the ease of only one unit on the crank. At anytime between the 1:30-3:00 shaft rotation positions, energizing the coils on the device causes no rotation because the rotor isn't already moving and it is in an "off" position for powering the coils for the first unit. In that range of shaft position, the device would have to be rotated externally to get it to the 3:00 position, at which point of course it would then start running on its own.

It is desirable therefore to mount, for example, three such disclosed motor-generator units on the same shaft, or on shafts that are mechanically linked. This example is for the above disclosed 8 pole configuration (8 coils, 8 magnets on each rotor). With the disclosure in mind, skilled persons will appreciate how to use more poles to effect shorter magnet arcs (all as described above) and thereby potentially reduce the number of motor-generator units that need to be on the same shaft to insure a self-start.

In this example there are three units, all controlled from a single rotary switch. The stator and coils on each unit are arranged 120 degrees offset with respect to each other, so that there is always one unit for which the magnets are all in a push relationship when the coils are energized. And it is these magnets that get pushed, start the one rotor to rotating, and with all units on a common or mechanically linked shaft, start all rotors simultaneously.

With three units on the shaft, the rotary switch does not energize the coils of all three simultaneously. The rotary switch does switch all three units on and off, but because of the 120 degree offset it energizes each coil set at its respective separate time. For example, when the shaft position is "Just past 12:00" it turns coil set 1 (first unit) on, which gets turned off at "just prior to 1:30" and back on again "Just past 3:00". The second coil (second unit) set gets turned on "just past 1:00" and off at "Just prior to 2:30" and then back on again at "just past 4:00". The third coil set (third unit) goes on at "just past 2:00", off at "Just prior to 3:30)" and back on at "just past 5:00. This on—off, sequential coil set activation pattern continues for the remaining three on-off cycles to return the shaft back to 12:00) position. See Table 1 below in summary.

TABLE 1

12:00-12:30-Set 3 & 1 "on"
12:30-1:00-Set 1 "on"
1:00-1:30-Set 1 & 2 "on"
1:30-2:00-Set 2 "on"
2:00-2:30-Set 2 & 3 "on"
2:30-3:00-Set 3 "on"
3:00-3:30-Same as 12:00-12:30 et seq.

Advantageous motor-generator examples include combinations of the above disclosures and examples. For instance, a desirable motor-generator-generator, in addition to the rotor, magnet, stator and coils arrangements disclosed above, also includes some kind of rotary electrical switch where the rotary switch enables paired alternating periods of current flow and no current flow into respective stator field coils, such that in a period pair the period of current flow is shorter than the period of no current flow, and a series of high capacity capacitors wired in parallel with the field coil power supply such that the capacitors alternately discharge into the held coils when the field coils are switched 'on' in a motor mode, and the capacitors are charged by power from the field coils when the field coils are switched 'of' and are operating in a generator mode.

The disclosed motor-generator advantageously has a generator shaft-linked to it, and at least a part of a generator electrical output is conducted to an electrical input of the motor-generator stator coils.

Also disclosed is a magnetic multiple shaft linkage for optional use with the apparatus disclosed above The structure has two axle components, such as two co-axial motor-generator units each having its own axle and axis of rotation, the respective axes of rotation of the two units generally parallel, or very nearly so. Each axle component includes a structure that has a circumferential band of magnets engaged for co-rotation with the axle. That is, when the axle rotates, so does the band of magnets and vice-versa. The axle is generally perpendicular, or very nearly so, with a plane defined by the rotating band of magnets.

In other words, a plane defined by the rotating band of magnets is perpendicular to the axis of the axle about which the band of magnets rotates. Thus the disclosed structure has at least two such axle components, with at least one band of magnets for each axle component, with the respective bands of magnets disposed in a common plane, and the two axle components are disposed within the magnetic multiple shaft linkage in a side-by-side relationship, such that the respective outer circumferences of the respective bands of magnets are in close proximity to each other.

Thus a connection exists between the respective side-by-side magnetic bands that is not a physical connection except for the interaction of the respective magnetic fields generated by the magnets. The two axle components are thus effectively rotatably interengaged for, in the absence of any magnetic interference, when one magnetic band turns, the other band turns also. In fact they will spin at the same speed in opposite directions just as two geared shafts laid side by side together (without intervening gears) would turn.

Magnets are desirably generally cylindrical, although other shapes may be made to serve, and each magnet has both a North and a South pole and an axis between those poles. The band of magnets is arranged in a circular band, with all North poles (alternatively, all South poles) facing outward; that is, with the pole axes all pointing inward toward the shaft.

A ferrous (for example: steel) plate is slidably mounted between the two axle units, so that the plate may on the one hand be slid free of magnetic interference with the respective magnet bands of the respective axle units; and on the other hand, may be slid to a variable and selectable interposition between the magnetic bands. Then depending on where the plate is positioned (free vs partial interposed vs completely interposed), the degree of magnetic influence from one band to the adjacent band is proportionately affected.

With the plate pulled all the way out (free) there is no interference with magnetic influence; with the plate all the way in (closed) the interference is complete and there is little to no magnetic influence between the axle units. With the plate partially interposed, the part of the bands that are interfered with (for instance the top halves) will not be magnetically influenced to rotate; but the unimpaired part (same example, bottom half) will be freely magnetically influence to rotate. Thus the bands which are circular and now magnetically imbalanced will induce axial rotation in the respective axle units, and the rotational force imparted from one band to the other is generally proportional to the degree to which the plate is free or partially interposed.

Multiple pairs of magnetic band-equipped axle units may be stacked, for instance in a pair down, pair up relationship. In such stacked arrangements of axle units, every interface between adjacent magnetic bands has its own ferrous plate. A control system to move each plate generally at the same time and in the same relative directions (that is, toward wide open or toward completely closed) and to the same degree, or very nearly so, is also desirable. The nature and manner of mounting such plates and the working of such a control system are believed to be within the knowledge of persons of ordinary skill in the art.

One other effect of this magnetic 'gearing' is that a plate-induced magnetic imbalance, as describe above, can be used to cause rotation from a relative standstill in any position of the axle units, thus allowing a rotational self start for the disclosed structure. Thus when the plate is moved from fully closed to partially or even half way open, the relative differences in attraction/repulsion between the parts of the band that are ferrously shielded and those that are not shielded give rise to a rotational moment in the respective bands.

An example of such a magnetic multiple shaft linkage is the side by side mounting of two of the above disclosed motor-generators, with their generally larger diameter stators very nearly touching, except for the width of the about 3-6 mm ferrous plate (in the disclosed example) and reasonable clearance for sliding. Plate width will vary roughly in proportion to magnetic strength of the rotor magnets, and easing on the units, and distance between the units, all as will be appreciated by those skilled in the art.

DETAILED DESCRIPTION

Special Definitions

Figure 1:
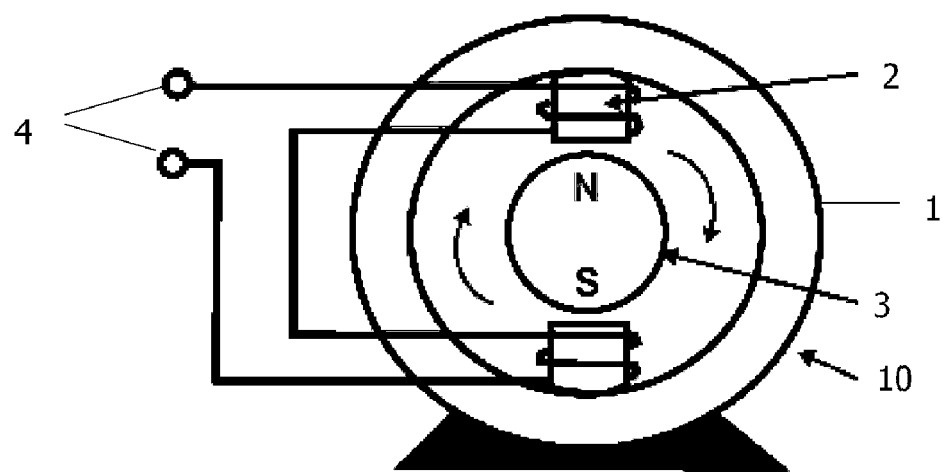
FIG. 1 is a schematic of known generator art.

Wherever used throughout the disclosure and claims, the term 'generally' has the meaning of 'approximately' or 'closely' or 'within the vicinity or range of'. The term 'generally' as used herein is not intended as a vague or imprecise expansion on the term it is selected to modify, but rather as a clarification and potential stop gap directed at those who wish to otherwise practice the appended claims, but seek to avoid them by insignificant, or immaterial or small variations. All such insignificant, or immaterial or small variations are intended to be covered as part of the appended claims by use of the term 'generally'.

Turning now to the drawings, electrical generating improvements will be described by reference to the numerals of the drawing figures wherein like numbers indicate like parts.

In FIG. 1, prior art generator 10 has stator 1, field coil 2, rotor 3, and current input output 4. These components interact in well-known fashion to generate a current.

Figure 2:
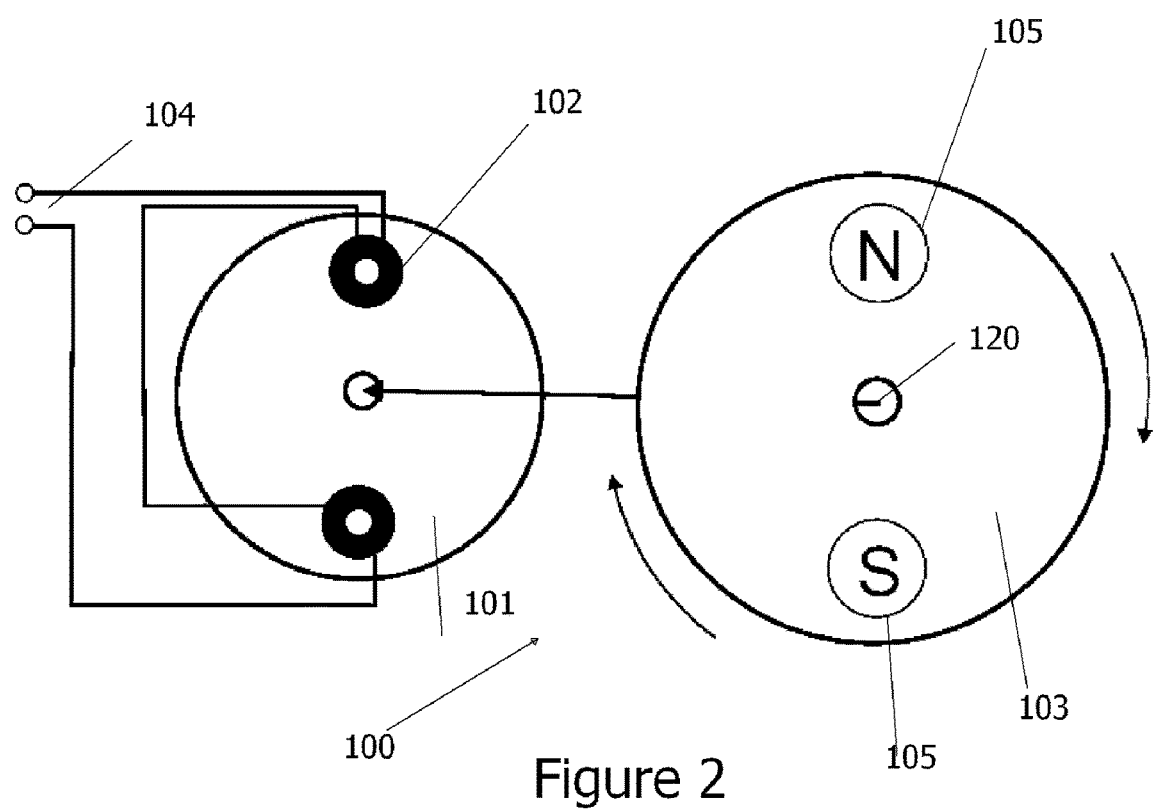
FIG. 2 is a schematic of field coil and rotor magnet interaction in the disclosed motor-generator.

In FIG. 2, motor-generator 100 has current input output 104, stator 101, field coils 102, rotors 103, permanent magnets 105, and shaft center 120. This figure schematically illustrates how center of magnet 105 on rotor 103 (which is coaxial with stator 101 via center shaft 120—though exploded in the drawing) passes directly over center of field coil 102.

Figure 3:
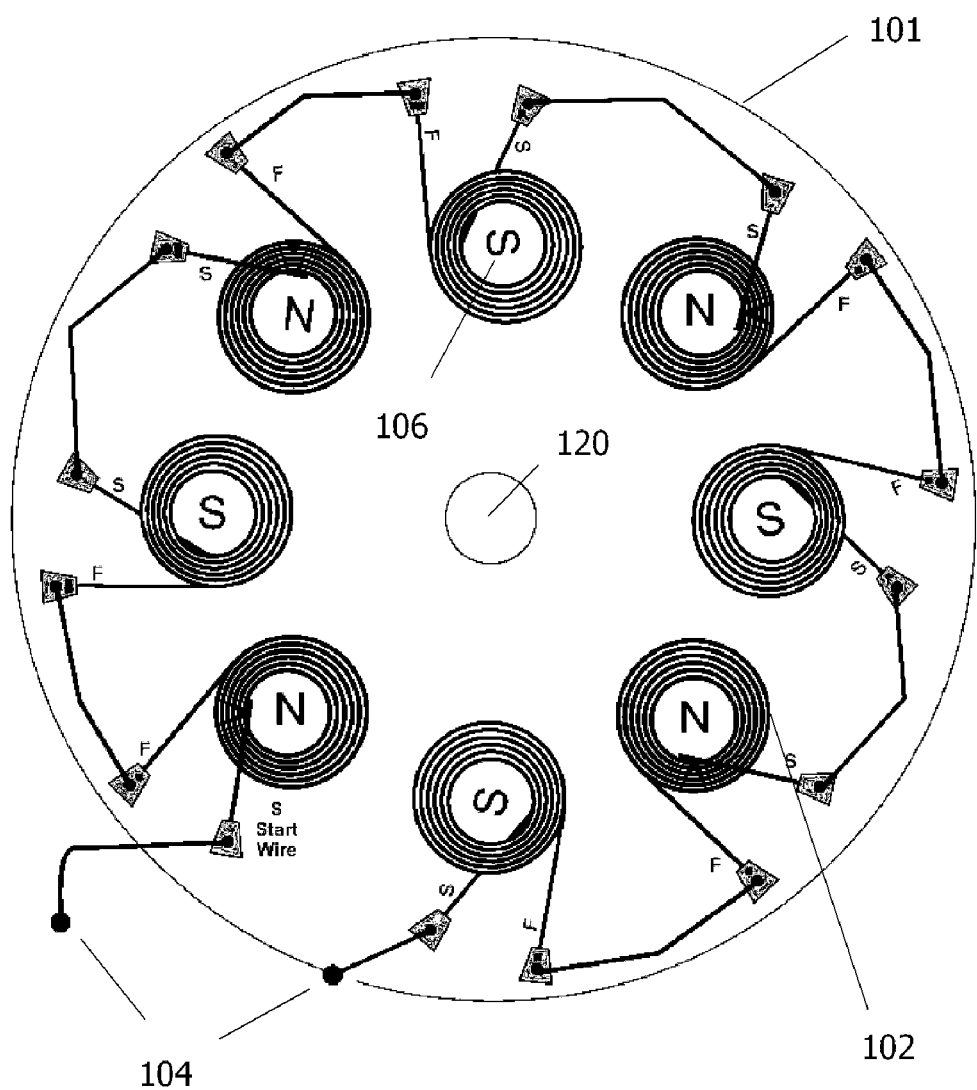
FIG. 3 is a field coil disposition schematic for the stator in the disclosed motor-generator.

In FIG. 3, stator 101 has current input output 104, field coils 102 which in turn have coil air cores 100. Shaft center 120 is illustrated for purposes of aligning this figure with other drawings as to location of the common shaft of the motor-generator. This figure schematically illustrates how field coils 102 are disposed and wired on stator 101.

Figure 4:
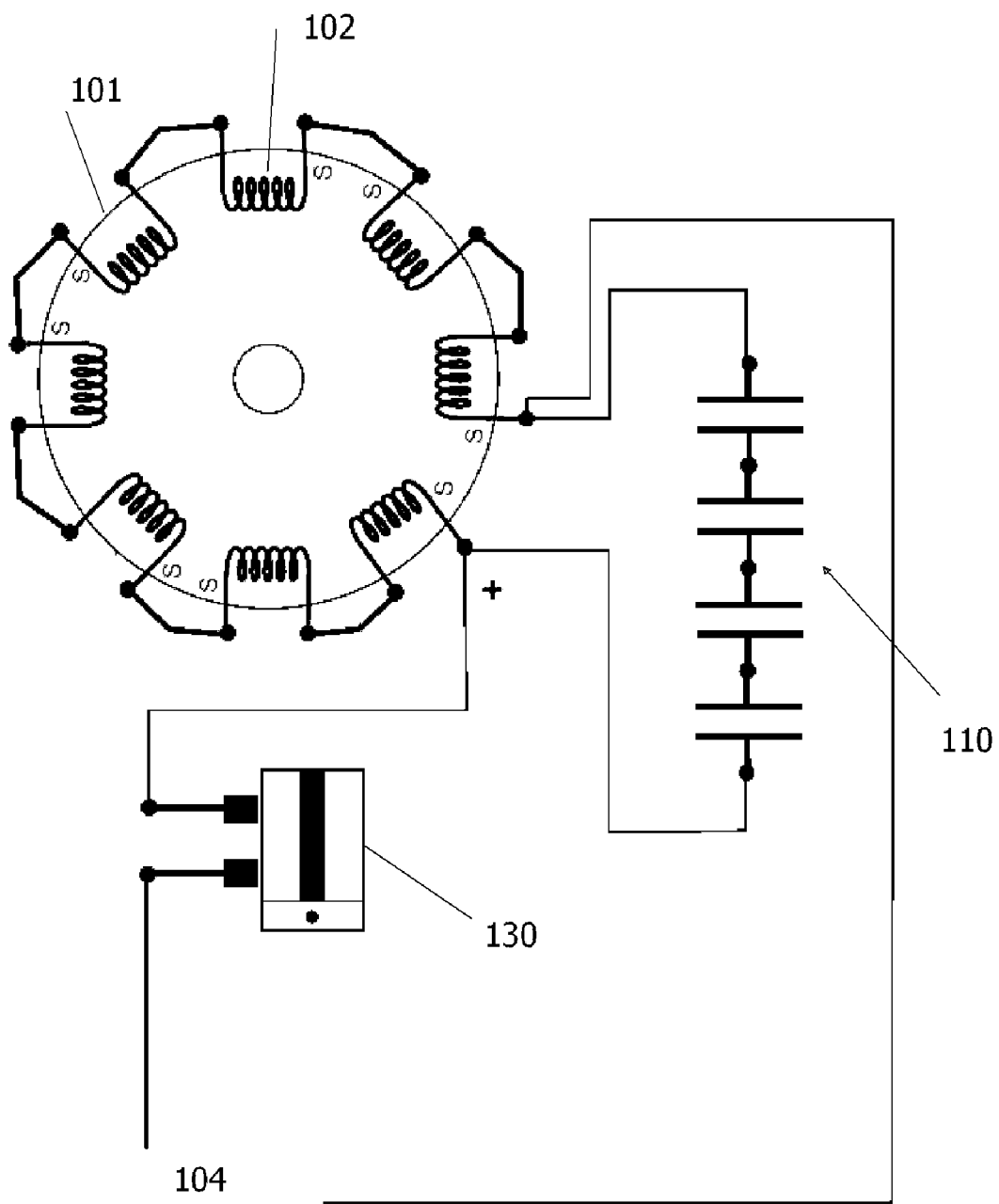
FIG. 4 is an electrical schematic of the disclosed motor-generator.

In FIG. 4, stator 101 has current input output 104, field coils 102, capacitors 110 and rotary switch 130 (for example a commutator). This figure schematically illustrates the wiring for field coils 102 and the rotary switch 110 and the capacitors 130.

In FIG. 4 an example wiring schematic is shown (coils are still as shown in FIG. 2, but only schematically illustrated here). A commutator coaxial with the axle of the rotors is employed to pulse input voltage to the stator coils. A DC input is applied to the coils during contact of the commutator brushes with the commutator contacts. This input comes desirably from voltage generated by a generator or second motor-generator (running solely in generator mode) that is shaft-linked or on the same shaft at the motor-generator with the commutator. The stator coil pulse voltage can also be applied from an external source.

FIG. 5 is a schematic illustration of repulsion motion that happens between an energized (polarized) field coil and a permanent magnet on the rotor. During voltage input to a coil it becomes a polar magnet and interacts with the magnet pair disposed on either side of it in well-known repulsor-attractor fashion (FIG. 5A). That is, the N pole of the coil repels an N pole of a nearby magnet, or attracts an S pole, while the S pole of the coil attracts an N pole of the nearest magnet on that side, or repels an S pole. In this way a pulsed, brief application of voltage to the coils causes the rotors to turn. FIG. 5B schematically illustrates the un-energized coil (Step 1, below) aligned with the rotor magnet and it's N pole at what we are calling the 12:00 position.

Figure 5A:
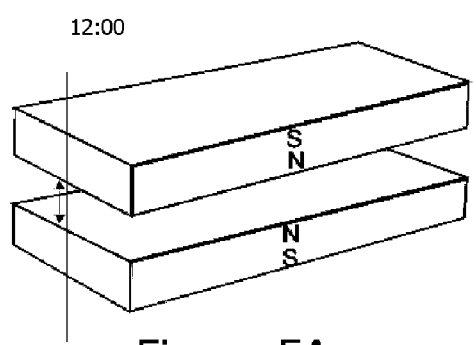
FIGS. 5A-D are schematics of magnetic interactions in the disclosed motor-generator.
Figure 5B:
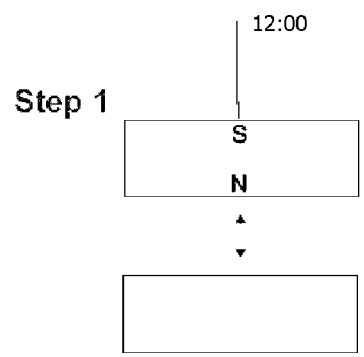
Figure 5C:
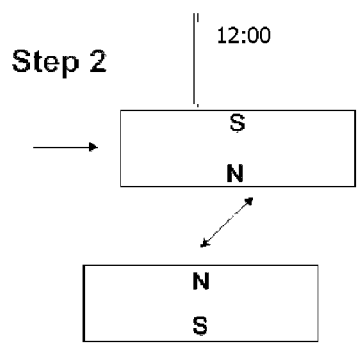
Figure 5D:
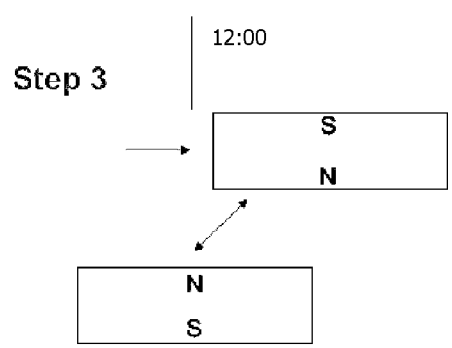

When a rotor N pole has proceeded to 'just past' center alignment (toward 12:30 position in Step 2, FIG. 5C) the respective coil is energized, creating an opposing N pole. This repels the magnet (above) which causes the rotor to spin (Step 3, toward 1:30 and beyond. FIG. 5D).

Figure 6:
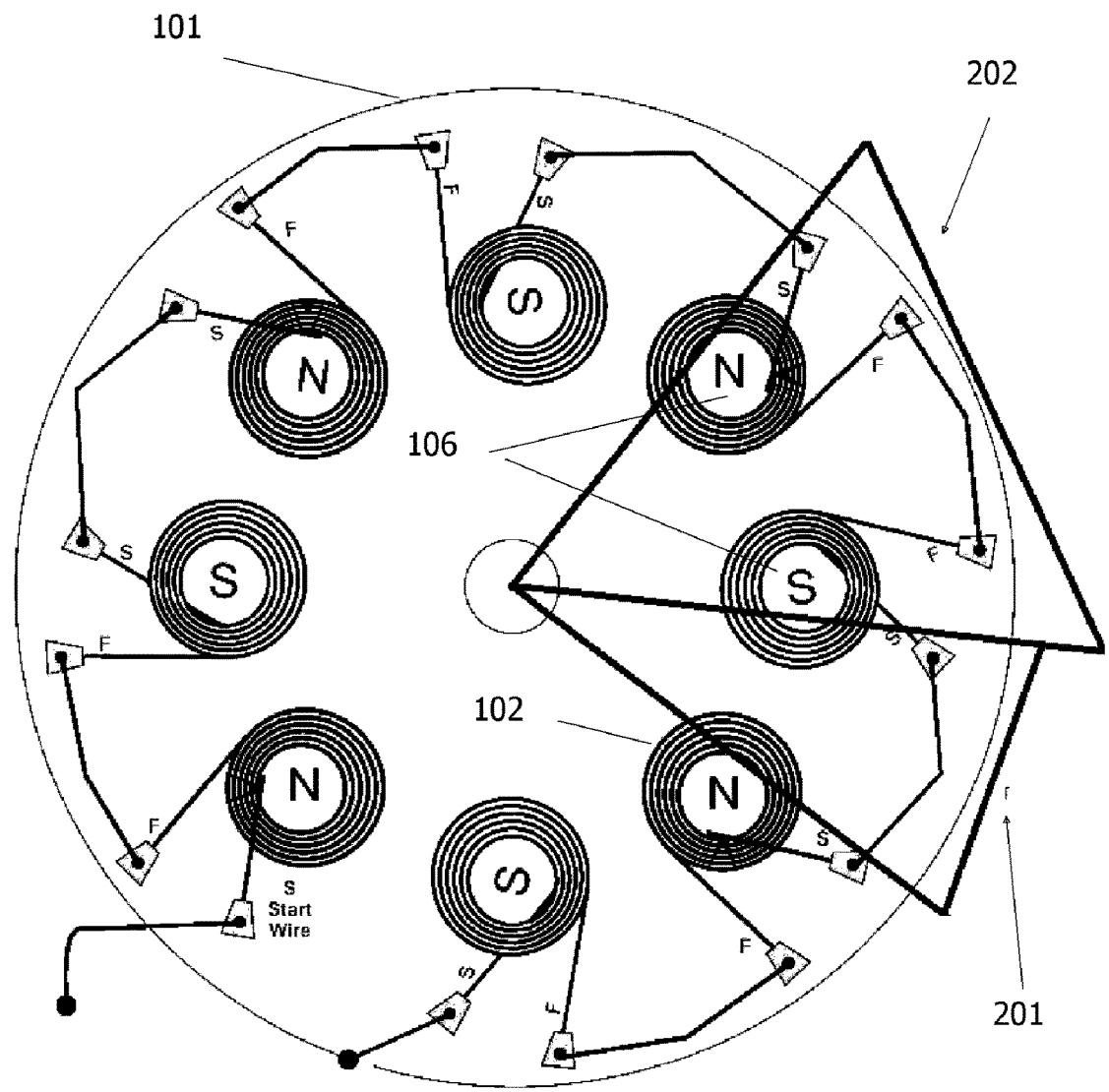
FIG. 6 is a schematic of field coil timing for the disclosed motor-generator.

In FIG. 6, the On-Off cycles of the field coils 102 on stator 101 are illustrated. Continuing from the example above, when the next rotor magnet pole (which is now an S pole facing the coil) is about to reach the coil, the illustrative cycle starts. When the example rotor pole is approaching center alignment (toward 11:30 position, or the upper radial line of the Off zone 202 of FIG. 6) the coil is turned off. The example rotor S pole is over the coil air core 106 of what would be (if it were energized) the N pole of the first of two coils in Off zone 202, and continues across air core 106 of the next coil 102 (which f it were energized would be a S pole) to the lower radial line of Off zone 202. During this transit time through Off zone 202, the motor-generator is in generator mode because no power is flowing into the cells. Instead the magnetic force of the magnet passing by the coils is generating current in the coils.

As the example S pole leaves Off zone 202, crossing immediately into On zone 201, the coils are once again energized, power is being applied to the coils and the unit is now acting as a motor, and not as a generator. The process schematically illustrated in FIG. 5 is repeated. The example S pole of the rotor magnet is repulsed by the energized S pole of coil 102 at the beginning of On zone 201, and as the example S pole of the magnet crosses about midway of On zone 201, it is attracted by the energized N pole of coil 102 at the end of On zone 201, thus continuing the rotational force on the rotor until the example S pole leaves On zone 201, crossing into new Off zone 202 (not illustrated), as the pattern repeats.

Figure 7:
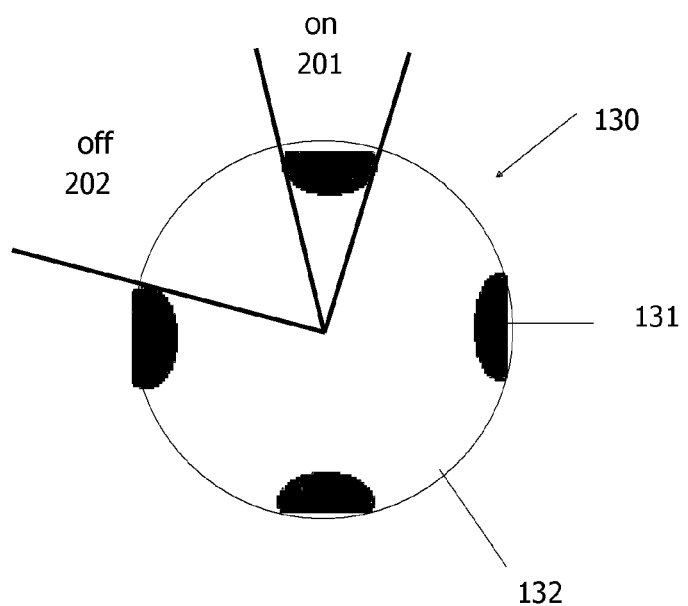
FIG. 7 is a schematic of rotary switch timing for the disclosed motor-generator.

FIG. 7 schematically illustrates rotary switch 130 (commutator in the figure, for ease of discussion, though persons skilled in the art will appreciate how other rotary switches are those also covered). Switch 130 has alternating electrical contacts 131 and insulated spaces 132, corresponding respectively to On zones 201 and Off zones 202. The rotary switch permits only a brief input of electricity to coils 102 (see FIG. 6) and when the brushes (in the commutator example) move off contact 131, the electrical input to the coils is cut off.

By this time however, the magnets of the rotors have moved to new positions relative to when and where they were when the current was applied to the coils. At this later time in the rotation of the magnets on their respective rotors, they are now passing over respective coils and generating current in the coils for a considerable arc, the arc defined in large part by the arc covered by insulator 132. See also timing schematic illustrated in FIG. 6. The commutator has relatively small contacts 131 compared to insulated spaces 132, so that it spends more time in an Off position 202 than in an On position 201. Thus the On-Off arcs 201 and 202 respectively in FIG. 6 correspond to the shape and spacing of the commutator contacts and the relative arcs shown in FIG. 7.

It is believed that one possible factor for suitable On-Off ratios has to do with the relative diameter of the air core (space inside the stator field coil windings) and the size of the magnet on the rotor. Desirably, the magnet has a diameter generally equal to the diameter of the air core, though larger or smaller magnets can be made to serve. So for example, the center of a magnet crossing into a core space of a particular coil is set as 'Off' for the coils, and only goes 'On' again as the center of the magnet leaves the core space of the next coil in the path of rotation. Thus the magnet crosses two successive core spaces during Off, and only the trailing portion and leading portion of two coil windings (no core spaces) during On. See illustrative arcs for Off and On in FIG. 6. Alternatively, instead of using the center of the magnet as the defining switch point, it can be the leading edge of the magnet.

In other words, at least in some examples, how these arcs are set and what the most effective ratios are depend on diameter of coil air space, diameter of magnet, width of coil windings and the spacing between the coils; the parameters of the commutator (or other shaft position sensing means) are advantageously set in accordance with these ratios and size considerations.

It should be noted that field coils and magnets have centers that become generally congruent at points during rotation of rotors; that is, the center of each magnet passes across the center of each coil, generally. Magnets are polar and have an axis between the poles that is also generally parallel to the axis of the motor shaft.

An example device is designed with an 8 pole setup. For any particular facing view of the poles of a rotor or a stator that would be 4 N and 4 S poles on the stator and on each rotor. This means that the coils are desirably cycled on and off 4 times per full rotor rotation of a rotor. During all transitions of a rotor pole over center of a coil pole ('center' here referring roughly to any magnet center to coil center position from 11:30 to 12:30—see FIG. 5), and across the windings on the other side of the coil pole and then across the nearside windings of the next coil (see FIG. 6, "Off" position), the coils are Off and the magnet motion produces current in the respective coils. Thus for a majority of rotation of the rotors the coils are turned off and are acting as generator coils. In this example device, for approximately 40% of rotation time power flows into the coils, with the other approximately ($60% of rotation time spent generating power from the coils. The generated current passes in parallel into the series of motor run capacitors.

The example device has the following pertinent specifications:

For the stator coils, copper wire, 17 AWG SAPTZ 152 turns are used. Coil diameter is roughly 75 mm, total coil wire length is roughly 100 m, total wire resistance is 1.69 ohms and each coil weighs approximately 0.94 Kg. The coils are RoHS compliant and have a dielectric rating of HIPOT at 1000 VAC.

The magnets and the coil air core space are both approximately 38 mm. The magnets are Neodymium N52 Class with a strength of 48.5 Kg pull force.

Rotor diameter is 31-32 cm, stator diameter is 36-37 cm. The distance from center to center of coils/magnets is roughly 12 cm, with a radius line from shaft center to center of coils/magnets being roughly 14.6 cm.

INDUSTRIAL APPLICABILITY

The disclosed motor-generator and its improved electrical generation provide significantly great efficiency in power generation than conventional models. Units can be built in compact form and operated in locations not usually associated with large scale power generation.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordion with the doctrine of equivalents.

I claim:

1. An electric motor-generator comprising:
    a motor-generator shaft having a shaft axis;
    a plurality of field coils generally evenly spaced about a periphery of a stator, one or more of the field coils wound about an axis generally parallel to the shaft axis, wherein axes of respective field coils are generally radially and equidistantly spaced from the shaft axis;
    a plurality of permanent magnets generally evenly spaced about a periphery of each of a pair of rotors, one or more of the magnets disposed along an axis of poles generally parallel to the shaft axis, wherein axes of respective magnets are generally radially and equidistantly spaced from the shaft axis on respective rotors by generally the same radius as the field coils are from the shaft axis, the pair of rotors disposed one on each side of the stator;
    such that during rotation of the rotors, a center, of each magnet generally passes across a center of each coil;
    the magnets arrayed on respective rotors in alternate pole orientation N-S S-N, the magnets of one rotor offset from the magnets of the other rotor by one pole orientation, such that as a N pole on the one rotor is passing directly across one end of a field coil, a S pole of a corresponding magnet on the other rotor is passing directly across the other end of the field coil;
    the motor-generator further comprising:
    a field coil power supply;
    a rotary electrical switch consisting of commutator with brushes;
    wherein the rotary switch enables paired alternating periods of current flow and no current flow into respective stator field coils, such that in a period pair the period of current flow is shorter than the period of no current flow;
    a series of high capacity capacitors wired in parallel with the field coil power supply such that the capacitors alternately discharge into the field coils when the field coils are switched 'on' in a motor mode, and the capacitors are charged by power from the field coils when the field coils are switched 'off' and are operating in a generator mode.

2. The motor-generator of claim 1 wherein the number of the plurality of permanent magnets on each rotor is equal in number to the number of the plurality of field coils.

3. The motor-generator of claim 1 wherein the field coils have air cores.

4. The motor-generator of claim 1 further comprising a second rotor-stator-rotor set on the same shaft.

5. The motor-generator of claim 1 further comprising a generator that is shaft-linked to the motor-generator shaft.

6. The motor-generator of claim 5 wherein the generator supplies at least a portion of power to the motor-generator that the motor-generator needs during a motor mode of the motor-generator.

7. The motor-generator of claim 5 wherein the generator is a second motor-generator.

8. The motor-generator of claim 7 the magnet polarities on one motor-generator offset from the magnet polarities on the other motor-generator such during operation, one motor-generator is always on.

9. An electric motor generator comprising:
    a motor-generator shaft having a shaft axis;
    a field coil power supply;
    a plurality of field coils generally evenly spaced about a periphery of a stator, one or more of the field coils wound about an axis generally parallel to the shaft axis, wherein axes of respective field coils are generally radially and equidistantly spaced from the shaft axis;
    a plurality of permanent magnets generally evenly spaced about a periphery of each of a pair of rotors, one or more of the magnets disposed along an axis of poles generally parallel to the shaft axis, the number of the plurality of permanent magnets on each rotor equal in number to the number of the plurality if field coils, wherein axes of respective magnets are generally radially and equidistantly spaced from the shaft axis on respective rotors by generally the same radius as the field coils are from the shaft axis, the pair of rotors disposed one on each side of the stator;
    such that during rotation of the rotors, a center of each magnet generally passes across a center of each coil;
    the magnets arrayed on respective rotors in alternate pole orientation N-S S-N, the magnets of one rotor offset from the magnets of the other rotor by one pole orientation, such that as a N pole on the one rotor is passing directly across one end of a field coil, a S pole of a corresponding magnet on the other rotor is passing directly across the other end of the field coil;

a rotary electrical switch consisting of commutator with brushes;

wherein the rotary switch enables paired alternating periods of current flow and no current flow into respective stator field coils, such that in a period pair the period of current flow is shorter than the period of no current flow;

a series of high capacity capacitors wired in parallel with the field coil power supply such that the capacitors alternately discharge into the field coils when the field coils are switched 'on' in a motor mode, and the capacitors are charged by power from the field coils when the field coils are switched 'off' and are operating in a generator mode.

10. The motor-generator of claim 9, wherein for a pair periods of current flow and no current flow a ratio of current flow to no current flow is less than or equal to 4:6.

11. The motor-generator of claim 9 further comprising a generator that is shaft-linked to the motor-generator shaft, wherein at least a part of a generator electrical output is conducted to an electrical input of the motor-generator stator coils.

12. The motor-generator of claim 9 wherein a plurality of the high capacity capacitors are selected from the group of capacitive devices consisting of motor run capacitor, battery capacitor and capacitor battery, all whether now known or later developed.

* * * * *